UNITED STATES PATENT OFFICE.

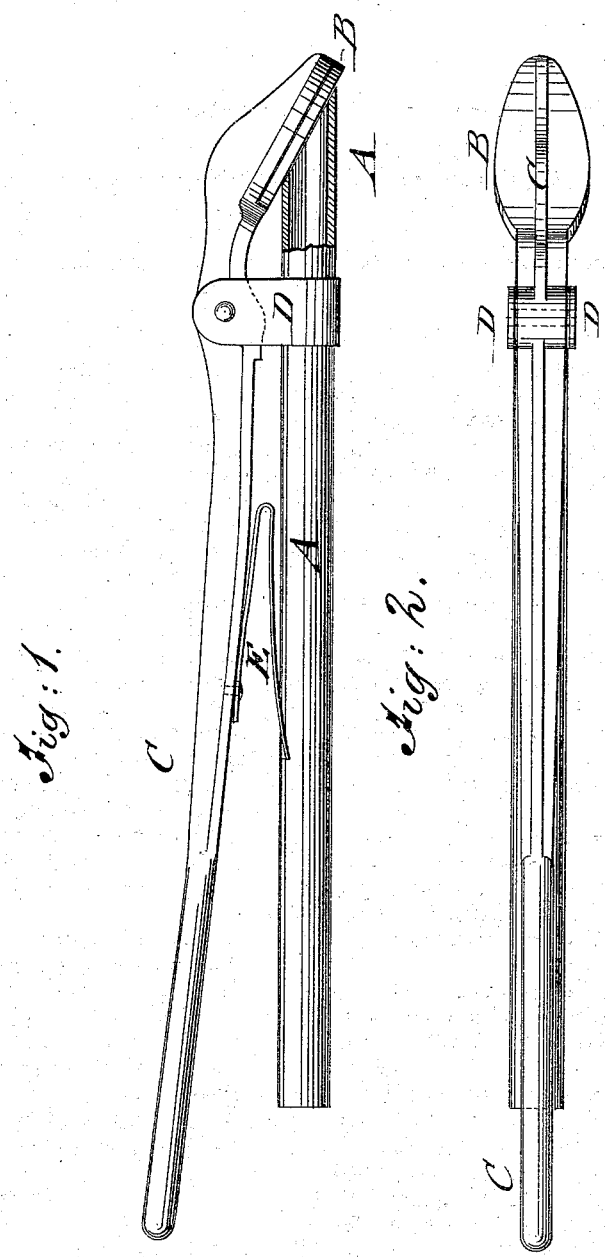

BIDDLE R. MOFFETT, OF SWEDESBOROUGH, NEW JERSEY.

IMPROVEMENT IN SPRINKLING-NOZZLES.

Specification forming part of Letters Patent No. 153,977, dated August 11, 1874; application filed July 25, 1874.

*To all whom it may concern:*

Be it known that I, BIDDLE R. MOFFETT, of Swedesborough, Gloucester county, New Jersey, have invented a new and Improved Sprinkling-Nozzle, of which the following is a specification:

In the accompanying drawing, Figure 1 represents a side view, and Fig. 2 a top view, of my improved sprinkling-nozzle.

Similar letters of reference indicate corresponding parts.

The object of my invention is to provide, for the purpose of watering sweet-potatoes, garden plants of all kinds, hot-beds, &c., an improved sprinkling-nozzle, by which the required distance and supply is readily provided in a very simple, effective, and labor-saving manner.

My invention consists of a nozzle with spout, cut off under suitable inclination, to be closed by a tightly-fitting packing at the end of a spring-lever, which is partially opened or closed by the hand to throw out the required quantity of water.

In the drawing, A represents the nozzle, which is applied in the usual manner to a hose connecting with the water pipe or reservoir. The spout of the nozzle A is cut under suitable inclination, and closed by rubber or other packing B, applied to the similarly-inclined front end of a spring-lever, C, which is pivoted to standard D of the nozzle. The packing B is of elliptical shape, and fits tightly over the spout of the nozzle, so as to prevent the escape of any water therefrom. A band-spring, E, acts on the handle of the lever, and forces the front end on the spout until opened by pressure on the lever-handle.

For the purpose of watering, the nozzle is held in one hand and the spring-lever depressed by the other, so as to produce the release of the packing and the escape of the water. The water being thrown out with certain force, impinges on the front packing of the lever, which makes under a certain angle with the direction of the water, and causes thereby the deviation from its course and its spreading into a broader sheet. The water is thrown to a greater or less distance from the spout as the lever is opened more or less.

The sprinkling is thereby fully within the control of the attendant, who can throw a more extensive sprinkle nearer to his position and an increased supply with less extent of sprinkle to a greater distance, which is of great importance in watering plants of all kinds with less trouble and loss of time.

Having thus described my invention, I claim as new and desire to secure by Letters Patent—

A sprinkling-nozzle for watering plants of all kinds, composed of a nozzle having a spout cut under a suitable angle of inclination, in connection with a pivoted spring-acted lever provided with a front packing under the same inclination as the spout, for closing the same tightly and throwing a broad sprinkle when opened, substantially as and for the purpose described and set forth.

BIDDLE R. MOFFETT.

Witnesses:
 JOHN FORD,
 JOS. R. MOORE.